United States Patent
Waha et al.

(10) Patent No.: US 11,962,031 B2
(45) Date of Patent: Apr. 16, 2024

(54) VENTILATION DEVICE FOR BATTERY AND BATTERY COMPRISING THE SAME

(71) Applicant: Samsung SDI Co., Ltd., Yongin-si (KR)

(72) Inventors: Bernhard Waha, Gratwein-Strassengel (AT); Alexander Roeck, Trofaiach (AT); Kim Dillenkofer, Eibiswald (AT); Georg Eichberger, Graz (AT)

(73) Assignee: XSamsung SDI Co., Ltd., Yongin-si (KR)

( * ) Notice: Subject to any disclaimer, the term of this patent is extended or adjusted under 35 U.S.C. 154(b) by 212 days.

(21) Appl. No.: 16/646,095

(22) PCT Filed: Oct. 5, 2018

(86) PCT No.: PCT/KR2018/011766
§ 371 (c)(1),
(2) Date: Mar. 10, 2020

(87) PCT Pub. No.: WO2019/088474
PCT Pub. Date: May 9, 2019

(65) Prior Publication Data
US 2020/0280030 A1 Sep. 3, 2020

(30) Foreign Application Priority Data

Oct. 30, 2017 (EP) ...................................... 17199096
Oct. 4, 2018 (KR) ........................ 10-2018-0118387

(51) Int. Cl.
*H01M 50/30* (2021.01)
*H01M 50/204* (2021.01)
(Continued)

(52) U.S. Cl.
CPC ......... *H01M 50/30* (2021.01); *H01M 50/358* (2021.01); *H01M 50/204* (2021.01); *H01M 50/224* (2021.01); *H01M 50/227* (2021.01)

(58) Field of Classification Search
CPC .... H01M 50/30; H01M 50/35; H01M 50/358; H01M 50/367; H01M 50/394;
(Continued)

(56) References Cited

U.S. PATENT DOCUMENTS

2012/0315510 A1  12/2012  TenHouten et al.
2013/0098912 A1   4/2013  Scagliarini et al.
(Continued)

FOREIGN PATENT DOCUMENTS

CN   102934260 A   2/2013
CN   104466050 A   3/2015
(Continued)

OTHER PUBLICATIONS

Extended European Search Report dated Dec. 1, 2017, for Application No. 17199096.3, 8pp.
(Continued)

*Primary Examiner* — Matthew T Martin
*Assistant Examiner* — Ankith R Sripathi
(74) *Attorney, Agent, or Firm* — Lewis Roca Rothgerber Christie LLP

(57) ABSTRACT

The present disclosure refers to a ventilation device for a battery, particularly to a multifunctional breathing and venting device for a casing of one of a battery submodule, battery module or battery system, such as for an electric vehicle and an energy storage system (ESS). The ventilation device comprising a housing configured for being attached to a vent opening of a battery casing in a sealing manner and comprising at least one lateral wall, a breathable filter separating an interior of the battery casing from a breathing chamber
(Continued)

within the housing, a venting membrane separating the breathing chamber from an exterior environment in a gas tight manner, and a breathing sprout fluidly connecting the breathing chamber and the environment and bypassing the venting membrane. The disclosure further relates to a battery comprising such a ventilation device attached to its casing.

15 Claims, 9 Drawing Sheets

(51) Int. Cl.
    *H01M 50/224* (2021.01)
    *H01M 50/227* (2021.01)
    *H01M 50/358* (2021.01)

(58) Field of Classification Search
    CPC ........... H01M 10/052; H01M 2220/20; H01M 2/1241; H01M 2/1252
    See application file for complete search history.

(56) References Cited

U.S. PATENT DOCUMENTS

| | | |
|---|---|---|
| 2015/0072184 A1 | 3/2015 | Kusunoki et al. |
| 2016/0036025 A1 | 2/2016 | Hofer |
| 2017/0069890 A1 | 3/2017 | Ishii et al. |
| 2017/0077472 A1 | 3/2017 | Ishii et al. |
| 2017/0271092 A1 | 9/2017 | Ishii et al. |
| 2020/0411824 A1* | 12/2020 | Tsang .................. H01M 50/325 |
| 2021/0359373 A1* | 11/2021 | Kadota .................... H01G 9/12 |

FOREIGN PATENT DOCUMENTS

| | | | |
|---|---|---|---|
| CN | 106061592 A | 10/2016 | |
| CN | 106068157 A | 11/2016 | |
| CN | 106102880 A | 11/2016 | |
| GB | 2517468 A | 2/2015 | |
| JP | 2013089375 A | 5/2013 | |
| JP | 2015-181153 A | 10/2015 | |
| JP | 2018-125278 A | 8/2018 | |
| KR | 10-0650998 B1 | 12/2006 | |
| KR | 10-2013-0088025 A | 8/2013 | |
| KR | 10-2015-0030600 A | 3/2015 | |
| KR | 10-2016-0112768 A | 9/2016 | |
| KR | 10-2016-0130419 A | 11/2016 | |
| KR | 10-2016-0131038 A | 11/2016 | |
| WO | WO-2010019764 A2 * | 2/2010 | ............. H01M 2/08 |
| WO | WO 2015/025017 A1 | 2/2015 | |

OTHER PUBLICATIONS

Chinese Office action issued in corresponding application No. CN 201880064176.X, dated Dec. 31, 2021, 19 pages.
Chinese Office action issued in corresponding application No. CN201880064176.X, dated Jul. 8, 2022, 7 pages with English Translation.
Korean Notice of Allowance issued in corresponding KR Application No. 10-2018-0118387, dated Feb. 15, 2024, 3 pages.

* cited by examiner

[Figure 1]
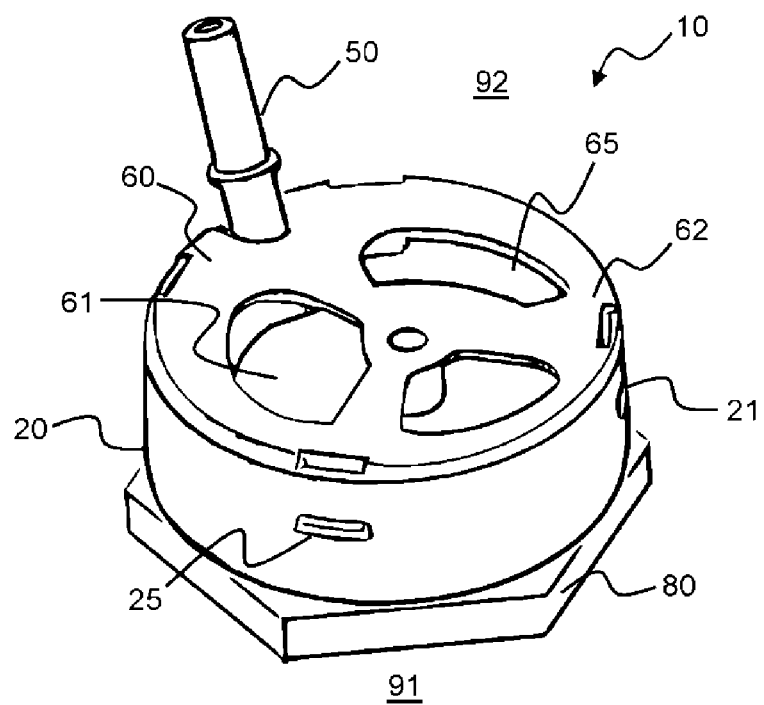

[Figure 2]
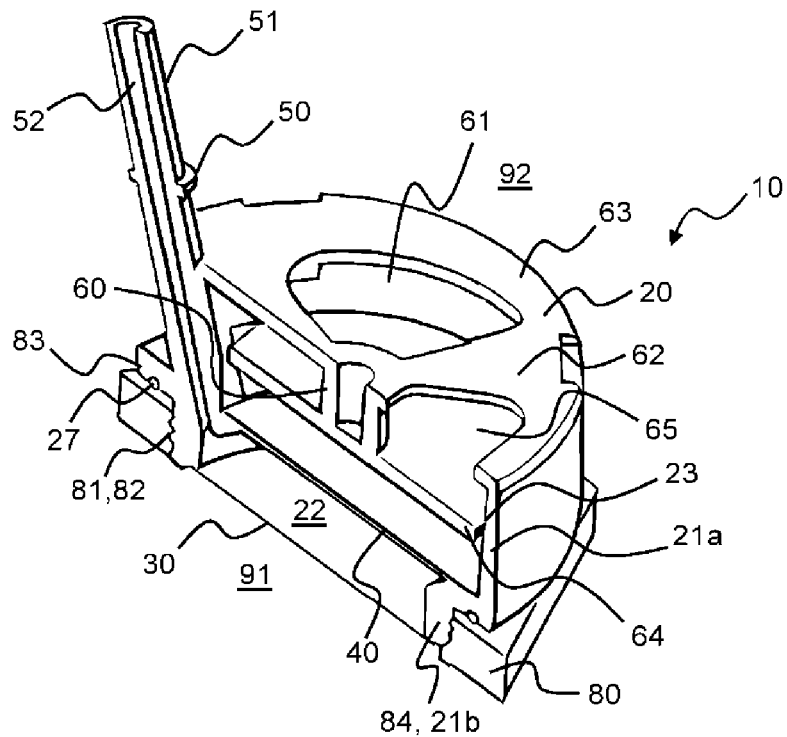
[Figure 3]
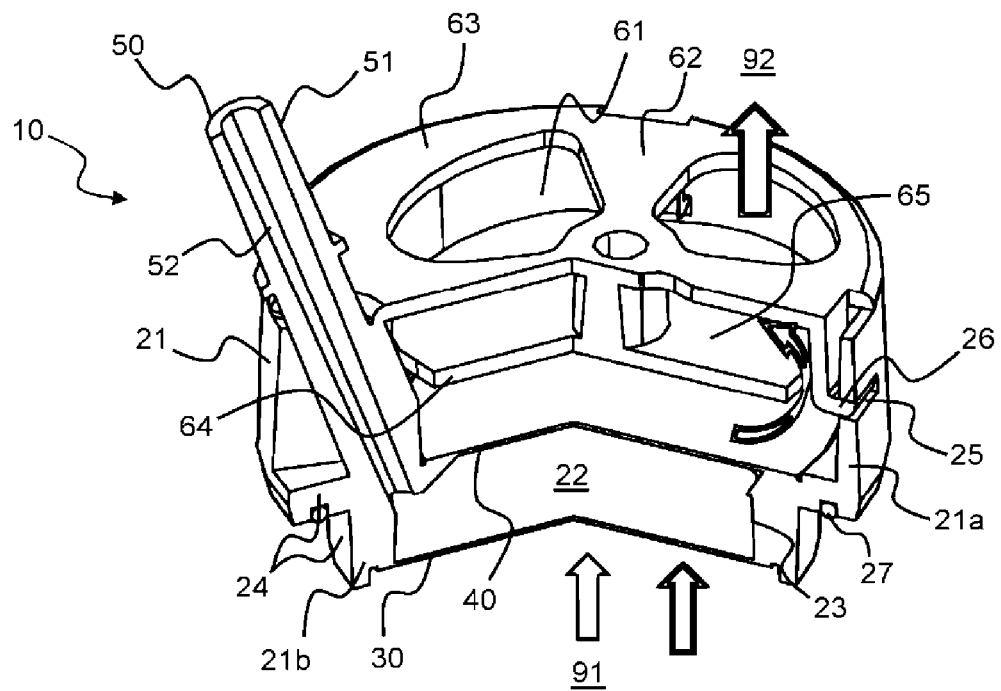

[Figure 4]
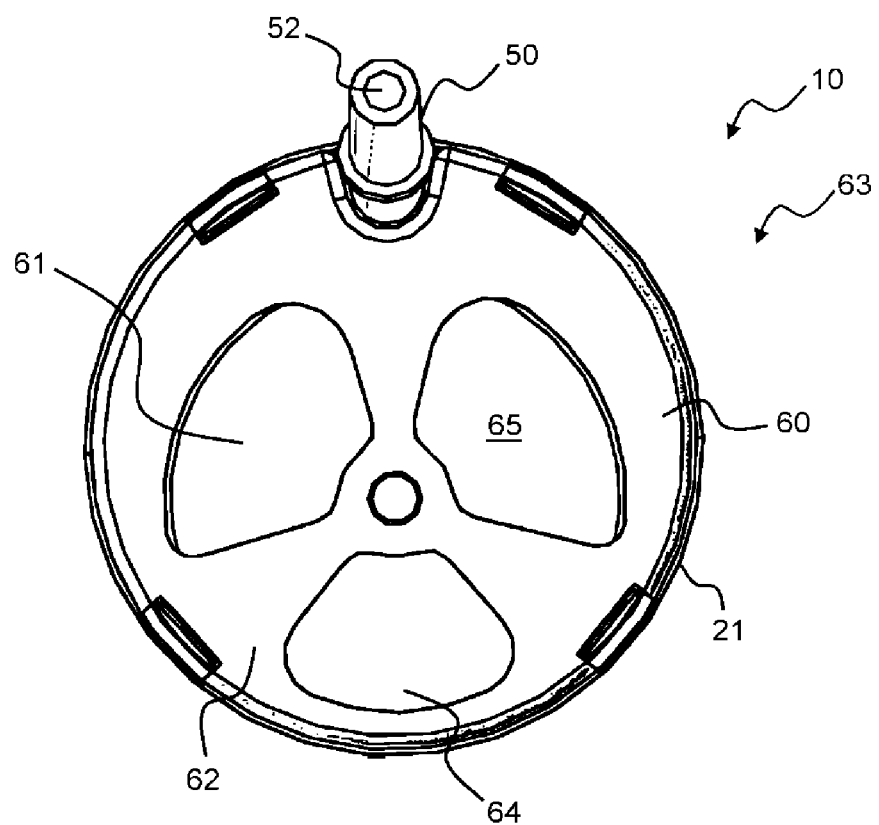

【Figure 5】
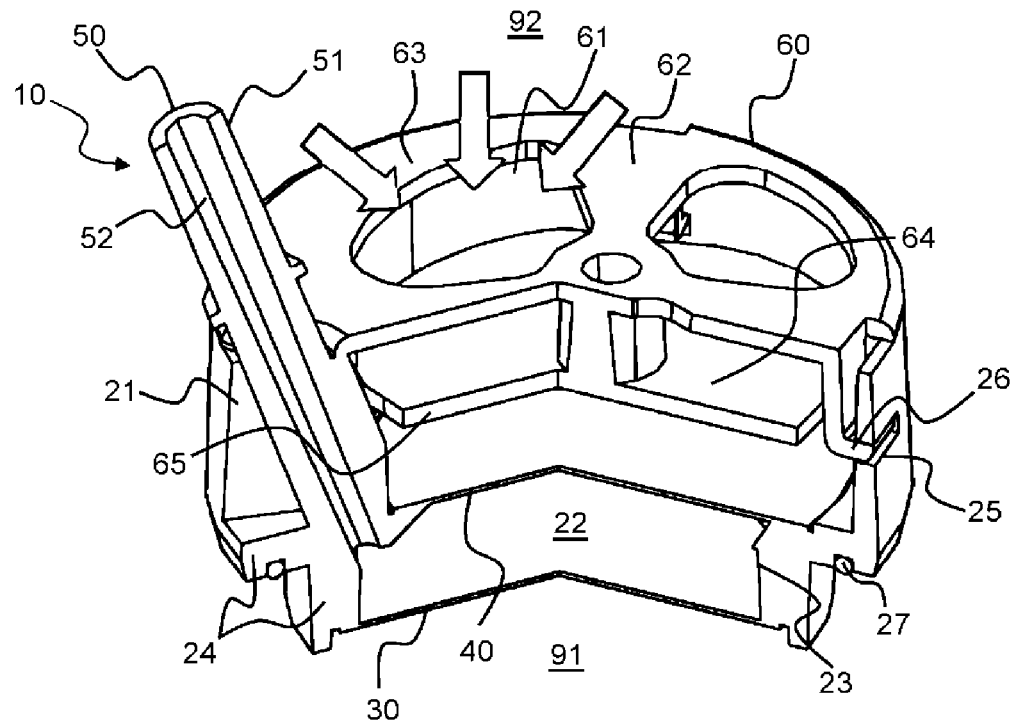
【Figure 6】
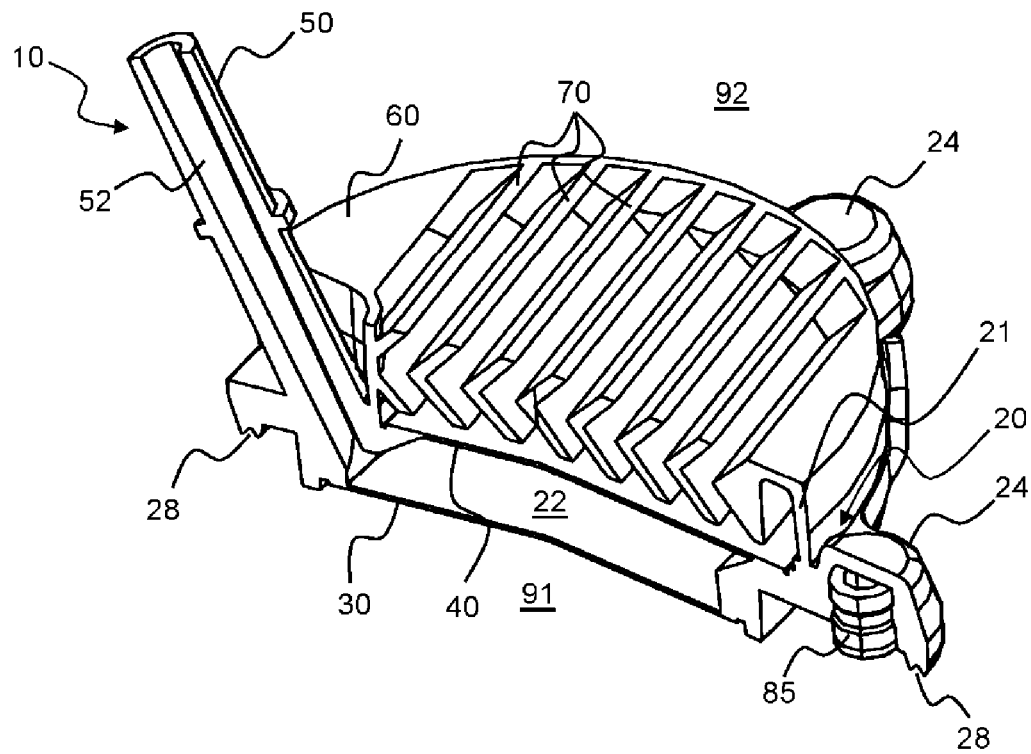

[Figure 7]
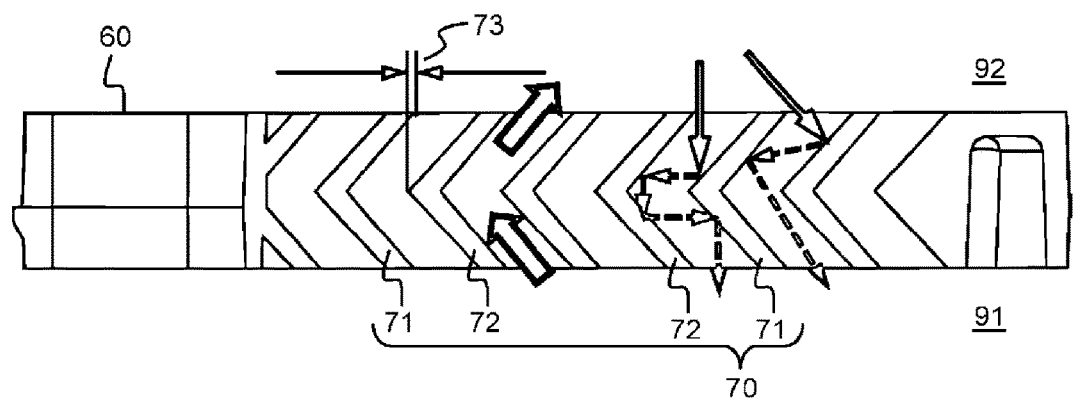
[Figure 8]
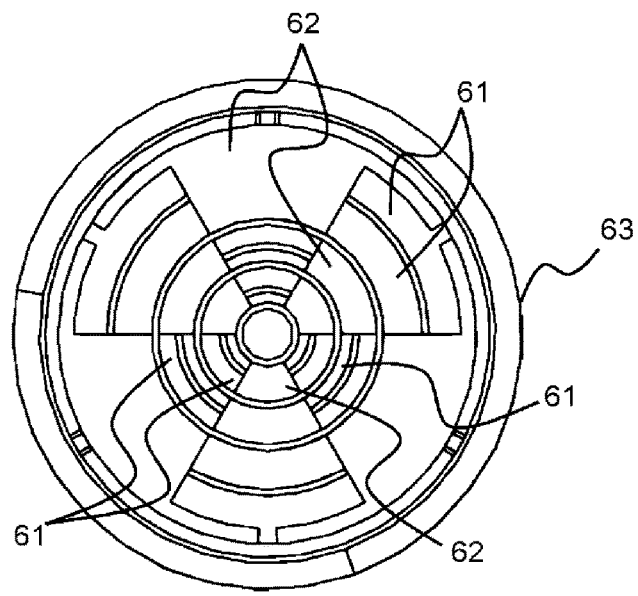

【Figure 9】
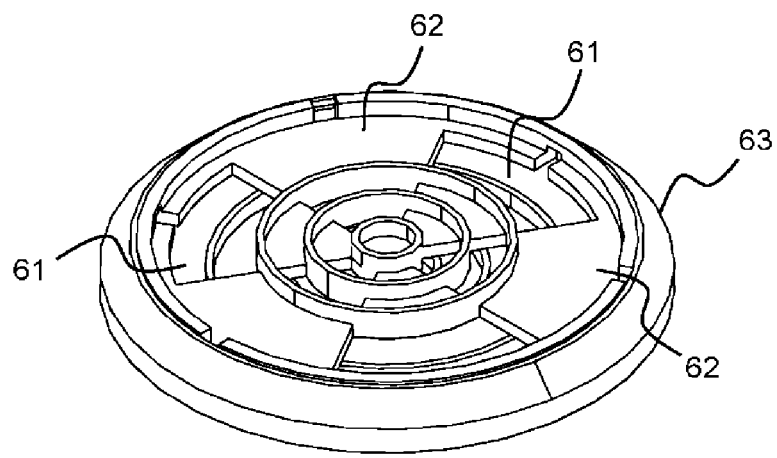
【Figure 10】
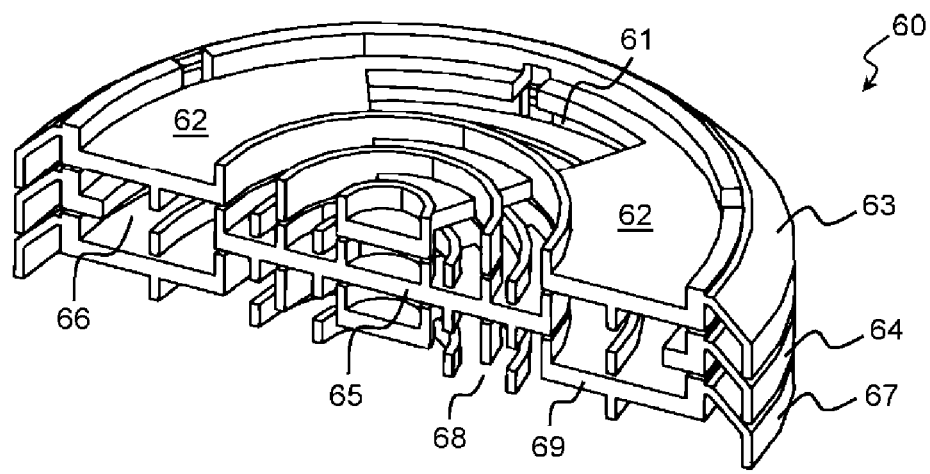

[Figure 11]
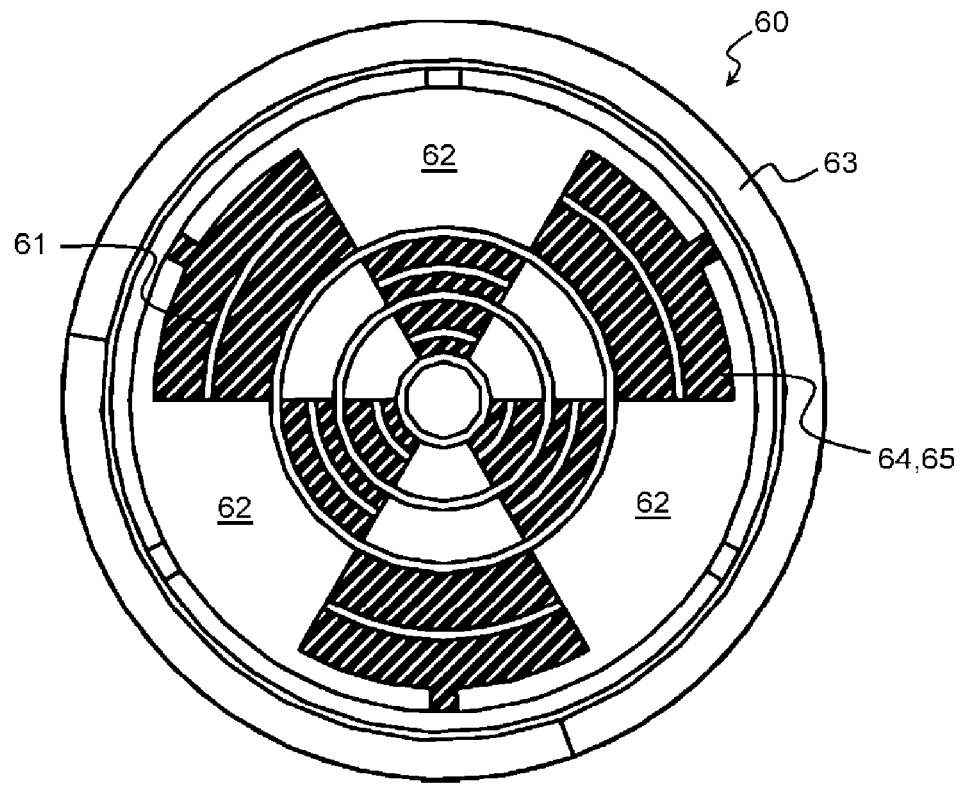
[Figure 12]
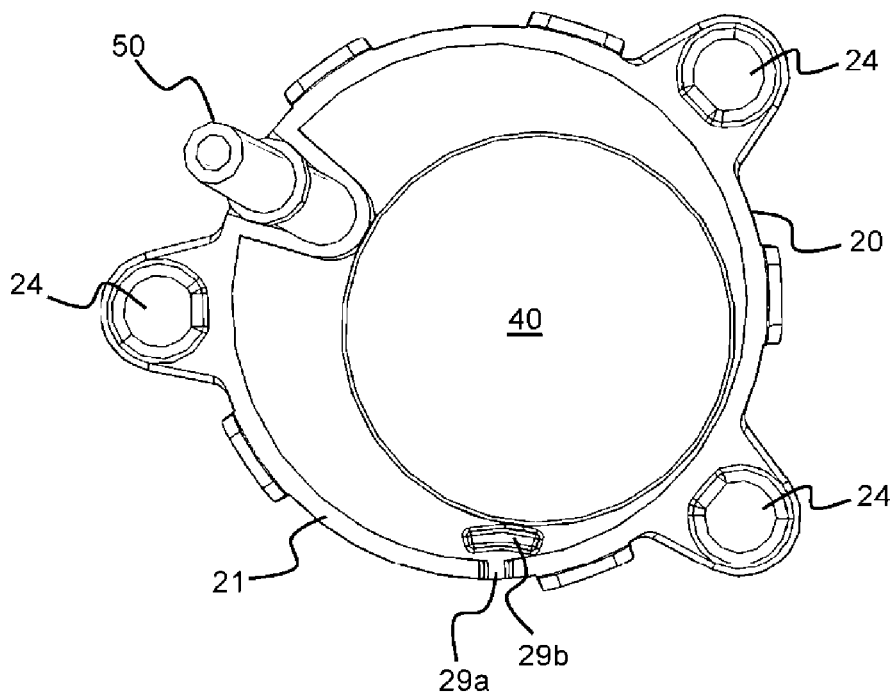

【Figure 13】
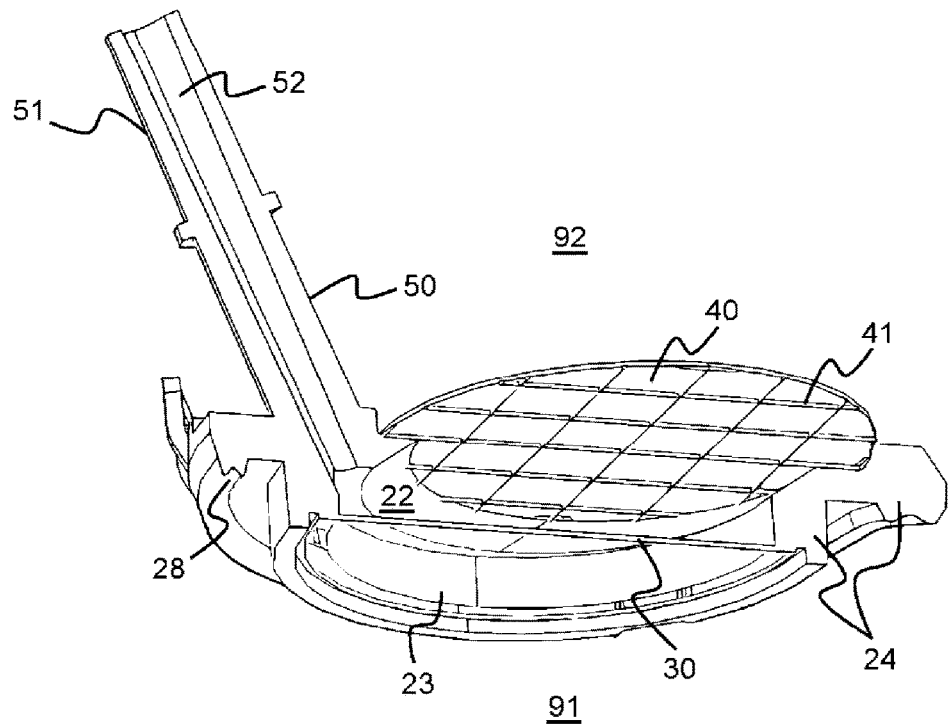
【Figure 14】
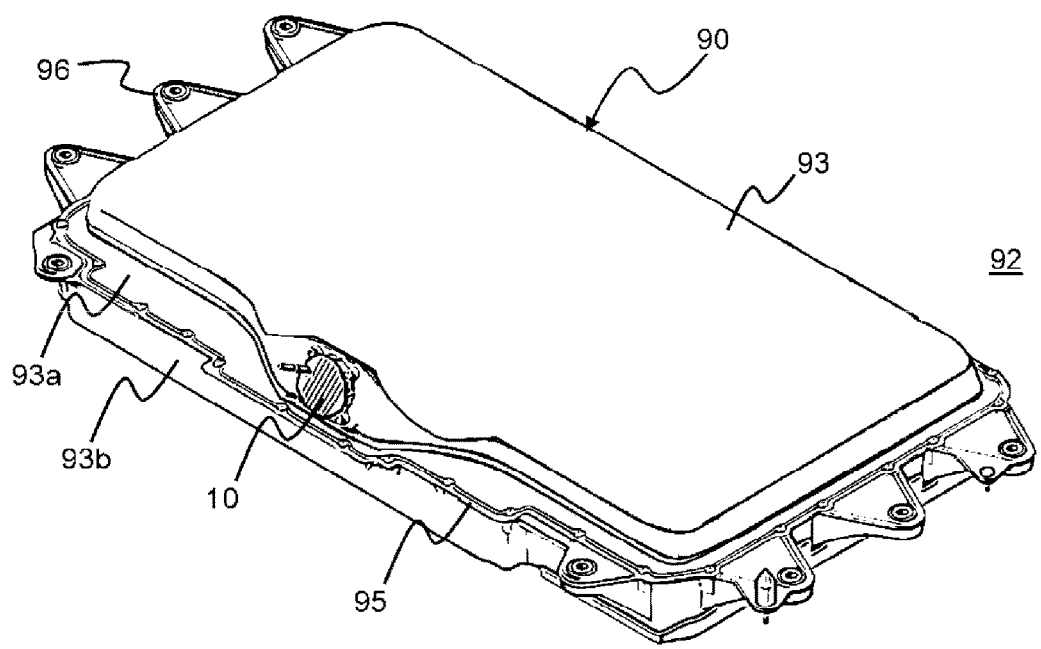

【Figure 15】
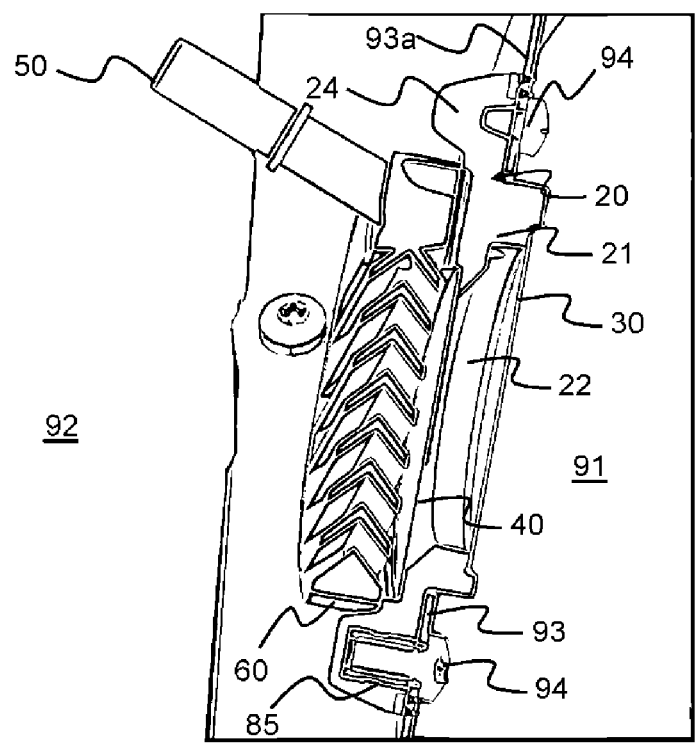

VENTILATION DEVICE FOR BATTERY AND BATTERY COMPRISING THE SAME

CROSS-REFERENCE TO RELATED APPLICATION(S)

This application is a National Phase Patent Application of International Patent Application Number PCT/KR2018/011766, filed on Oct. 5, 2018, which claims priority of European Patent Application No. 17199096.3, filed on Oct. 30, 2017 and Korean Patent Application No. 10-2018-0118387, filed Oct. 4, 2018. The entire contents of all of which are incorporated herein by reference.

TECHNICAL FIELD

The present disclosure relates to ventilation device for a battery, particularly to a multifunctional breathing and venting device for a casing of one of a battery submodule, battery module or battery system that is configured for being integrated in that casing.

BACKGROUND ART

A rechargeable or secondary battery differs from a primary battery in that it can be repeatedly charged and discharged, while the latter provides only an irreversible conversion of chemical to electrical energy. Low-capacity rechargeable batteries are used as power supply for small electronic devices, such as cellular phones, notebook computers and camcorders, while high-capacity rechargeable batteries are used as the power supply for hybrid vehicles and the like.

In general, rechargeable batteries include an electrode assembly including a positive electrode, a negative electrode, and a separator interposed between the positive and negative electrodes, a case receiving the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. The shape of the case, e.g. cylindrical or rectangular, depends on the battery's intended purpose.

Rechargeable batteries may be used as a battery module formed of a plurality of unit battery cells coupled in series and/or in parallel so as to provide a high energy density, e.g. for motor driving of a hybrid vehicle. That is, the battery module is formed by interconnecting the electrode terminals of the plurality of unit battery cells depending on a required amount of power and in order to realize a high-power rechargeable battery, e.g. for an electric vehicle.

Battery modules can be constructed either in block design or in modular design. In block designs, each battery cell is coupled to a common current collector structure and a common battery management system. In modular designs, pluralities of battery cells are connected to form submodules and several submodules are connected to form the battery module. Battery management functions may be realized either on module or submodule level and thus interchangeability of the components is improved. One or more battery modules are mechanically and electrically integrated, equipped with a thermal management system and set up for communication with one or more electrical consumers to form a battery system.

Either on battery submodule level, on battery module level or on battery system level a casing can be foreseen for enclosing all the components constituting the respective unit. To provide thermal control of the enclosed components a thermal management system may be used to efficiently emit, discharge and/or dissipate heat generated within the casing. If such thermal management system is omitted or the heat drain from the casing is not sufficiently performed, an increase of the internal temperature can lead to abnormal reactions occurring therein. An example of such abnormal operation condition is a thermal runaway of a battery cell that may be entered by strongly overheated or overcharged Lithium ion cell. The thermal runaway is a self-accelerating chemical reaction inside the cell, which produces high amounts of heat and gas, until all available material is exhausted. Due to high amounts of hydrogen and carbon monoxide within the produced gas, the produced gases may be toxic and flammable.

Usually a battery cell comprises a venting opening for allowing the gas produced in an abnormal operation condition to be released from the cell if a certain overpressure and/or a certain temperature inside the cell is exceeded. However, the battery submodule, battery module or battery system casing normally encloses the components therein in an essentially gas tight manner. Hence, it is required to implement an opening in the submodule, module or system casing as well in order to prevent damage to the casing and its sealing due to the highly increased inside pressure. This opening shall allow for draining away the venting gases safely in order to protect persons from dangerous fumes and gases that may occur during thermal runaway (venting) or other dysfunctions of battery cells within the casing.

During normal function of the battery cells the venting opening in the casing has to ensure protection against intrusion of obstacles and humidity. This may be achieved by filter elements, such as membranes. In order to have a fast draining of the venting gas theses filter elements are usually configured to open at a specified over-pressure and/or temperature.

Submodule, module or system casings further require a breathing device to prevent the casing, particularly the casing's sealing, to get untight due to pressure differences between outside and inside. The breathing device has to ensure pressure balance between the inside of the casing and its environment during normal operation conditions. Mostly, the breathing element is separated from the venting opening and configured to close in a venting event.

Hence, submodule, module or system casings usually comprise two devices for venting and breathing. Combined venting and breathing devices usually consist merely of simple filter elements, such as water-tight and gas permeable membranes that ensure humidity and dust protection and that rupture in a venting event. However, breathing gas flow through these devices is strongly limited and typically these devices are not able to fulfill higher IP ratings.

DISCLOSURE

Technical Problem

It is thus an object of the present disclosure to overcome or reduce at least some of the drawbacks of the prior art and to provide a combined breathing and venting device for a battery, particularly for a casing of one of a battery submodule, battery module or battery system, that ensures pressure balance and protects against intrusion of particles, dust fluids and humidity during normal operation and provides reliable gas release in a venting event.

Technical Solution

One or more of the drawbacks of the prior art could be avoided or at least reduced by means of the present disclosure. In particular, a ventilation device for a battery is provided, the ventilation device comprising a housing that is configured for being attached to a vent opening of a battery casing in a sealing manner and that comprises at least one lateral wall, a breathable filter that is separating an interior of the battery casing from a breathing chamber within the housing, a venting membrane that is separating the breathing chamber from an exterior environment in a gas tight manner, and a breathing sprout that is fluidly connecting the breathing chamber and the environment and that is bypassing the venting membrane.

In the context of the present application, a battery is to be understood as one of a battery submodule, a battery module and a battery system. Hence the battery casing is to be understood to be a casing of one of a battery submodule, a battery module and a battery system. The housing of the ventilation device may be configured to be attached to the battery casing for covering and/or overlapping the vent opening or may be configured to be inserted into the vent opening. The at least one lateral wall may be made from a plastic or metallic material, particularly from an injection molded thermosetting plastic material. Hence the housing comprises at least one solid lateral wall, while its bottom surface and its top surface can be open. Hence, the at least one lateral wall can be considered as a fluid conduit connecting the bottom surface as a first opening with the surface as a second opening, wherein the first opening is fluidly connected to the vent opening of the battery casing.

The breathable filter is configured to be breathable and hence allows gas passage through it, while as a filter it is at least dust tight and is hence blocking dust and other obstacles from passing the filter. The breathable filter is dust tight in a manner that suffices the IP6x protection level according to the Ingress Protection Marking. Where it is referred to an IP protection level herein it is referred to at least one of the standards ISO 20653:2013, DIN EN 60529 and IEC 60529, the whole content of which is incorporated herein by reference, particularly with respect to definitions and testing methods of the various IP levels. The breathable filter may be welded, particularly ultrasonic welded, bonded or overmolded to the at least one lateral wall of the housing, to an inner side of the lateral wall or to a face of the lateral wall and/or the housing. Therein the connection between the breathable filter and the inner side of the housing also suffices the IP6x protection level. Alternatively, the breathable filter can also be connected to a (inner side of a) cover as described below.

The breathable filter is further configured to separate an interior of the battery casing from a breathing chamber within the housing of the ventilation device. In use of the ventilation device with a battery, the breathable filter may be within the interior of the battery casing, within the vent opening of the battery casing or exterior to the battery casing. Essentially, the breathable filter completely covers the fluid conduit formed by the housing of the ventilation device that is connecting the casing interior and exterior through the vent opening. The breathable filter's side facing away from the interior of the battery casing is one boundary surface of a breathing chamber formed within the housing of the ventilation device, i.e. within the fluid conduit as described above. Such breathing chamber is described in more detail below. No fluid bypass around the filter exists between the casing interior and the breathing chamber.

The venting membrane is made from a solid thin material, particularly from a thin metal or plastic material as a membrane, and hence is at least essentially gas tight. Gas tight refers to a leakage rate that allows no gas flow through the venting membrane during normal operation of a battery comprising the ventilation device of the disclosure. The leakage rate of the venting membrane suffices leakage class I as defined in the standard ANSI/FCI 70-2 1976(R1982) the content of which is incorporated herein by reference, particularly with respect to the definition and testing methods of the leakage classes. The venting membrane suffices leakage class II, III, IV, V or VI as defined in the aforementioned standard. The venting membrane is welded (particularly ultrasonic welded) bonded or overmolded to an inner side of the housing. Therein the connection between the breathable filter and the inner side of the housing suffices the IP67 or IP68 protection level. The venting membrane itself also suffices the IP67 or IP68 protection level. Hence, the venting membrane and its connection to an inner side of the housing provide humidity and dust protection of the breathing chamber. The venting membrane is dust tight as defined in above standards related to IP rating. The venting membrane is a further boundary surface of the breathing chamber and separates it from the exterior environment in a gas tight manner. Alternatively, the venting membrane can also be connected to a (inner side of a) cover as described below.

In the ventilation device according to the disclosure, a breathing chamber is hence enclosed by the breathable filter, the venting membrane and the at least one lateral wall of the housing. Therein gas can enter the breathing chamber through the breathable filter but cannot exit the breathing chamber through the solid lateral wall of the housing or the intact venting membrane. However, gas can exit the breathing chamber via the breathing sprout fluidly connecting the breathing chamber and the environment, while bypassing the venting membrane. The breathing sprout comprises a hollow tube with a first opening within the breathing chamber and a second opening towards the exterior, wherein a lateral outer wall of the hollow tube is sealed with respect to the enclosure of the breathing chamber. Particularly at least a part of the breathing sprout may be an integral part of or molded into the lateral wall of the housing. Further, the lateral wall of the sprout comprises a section protruding from an outer wall of the housing, e.g. for attaching a breathing tube.

The ventilation device according to the disclosure is configured to perform a breathing function during normal operation of a battery comprising the ventilation device. Therein due to pressure differences between an exterior environment and the interior of the battery casing air streams between them via the breathing sprout, the breathing chamber and the breathable filter, while particles and dust transported by the air stream gets filtered by the breathable filter. As the venting membrane is a solid foil and sealed to the housing, the breathing air is not able to pass the venting membrane or stream elsewhere. Further, as a breathing chamber is foreseen in the housing small particles or dust are not able to bung the breathing hole.

The venting membrane of the ventilation device, particularly by its material, thickness and/or connection type to the housing, is further configured for rupturing in a venting event of the battery. The venting membrane is configured to rupture at a pressure that is equal to or lower than a maximum allowed pressure within the battery casing. In a venting event a large amount of hot gas streams out of the battery casing into the ventilation device. The pressure and temperature raise caused by the gas stream destroys at least the venting membrane and the breathable filter, if a predetermined breaking pressure and/or breaking temperature of the venting membrane and/or the breathable filter are reached.

The ventilation device of the present disclosure provides a highly integrated solution for battery casing venting and breathing in a single device that requires a low build-in space and ensures high protection against intrusion of particles, dust, fluids and humidity. Particularly, with a single device higher degrees of protection up to IP68 and IP6k9k can be provided without separation of the functionalities of breathing and venting and with reduced costs. In a venting event, the ruptured venting membrane provides a flow area for the vent gas stream that is larger than the flow area of the breathing sprout, at least two times, three times or five times larger. Hence, the vent gas stream can be emitted safe and fast from the casing.

In an embodiment, the ventilation device according to the disclosure further comprises a cover that is connected to the lateral wall of the housing and that is configured for protecting the venting membrane from environmental influences. The cover is at least partially overlapping a first surface of the venting membrane opposite to a second surface of the venting membrane in a normal direction of the venting membrane, wherein the second surface is a boundary surface of the breathing chamber. The cover is either inextricably connected (e.g. welded) to or detachably attached (e.g. clipped) to the lateral wall of the housing. Alternatively, the cover is formed as a single piece with the housing of the ventilation device.

The cover provides protection of the venting membrane up to a degree according to IP6k9k, particularly a protection of at least IP6k9k, and hence protects the venting membrane from accidental damaging or water jets, e.g. during washing. The cover overlaps the first surface of the venting membrane such that no linear path from the first surface of the venting membrane to the exterior environment can pass through the cover without being blocked by the cover. Hence, no water jet coming from any direction is able to hit the venting membrane directly.

The cover comprises at least one opening, wherein a flow area through the at least one opening is larger than a flow area of the breathing sprout. The flow area through the at least one opening is at least three times, particularly preferred at least five times, further preferred at least ten times of the flow area through the breathing sprout. Further preferred, the at least one opening is configured such that vent gas is able to stream from the battery casing interior to the exterior environment in a timely manner, preferably before the maximum allowed pressure within the battery casing is reached or exceeded. In the context of the present disclosure, the flow area refers to the maximum area available for a fluid stream or gas stream in a fluid conduit in a cross section of that fluid conduit.

In an embodiment, the cover comprises a top cover with at least one first open section and at least one first closed section and a baffle cover with at least one second closed section The baffle cover is spaced apart from the top cover in a normal direction of the venting membrane and disposed between the top cover and the venting membrane. The baffle cover is inextricably connected to the top cover, detachably attached to the top cover or formed as a single piece with the top cover. According to this embodiment, the at least one second closed section overlaps the at least one first open section in the normal direction of the venting membrane. Hence, each linear path from the first surface of the venting membrane through the at least one first open section is blocked by the at least one second closed section. A total size of the at least one second closed section exceeds the size of the at least one first open section and/or of the venting membrane.

In another embodiment, the cover further comprises a lower cover that is spaced apart from the baffle cover in a normal direction of the venting membrane such that the baffle cover is disposed between the top cover and the lower cover. The lower cover comprises at least one third open section and at least one third closed section. In this embodiment, the baffle cover also comprises at least one open section. The at least one third closed section overlaps at least one second open section in the normal direction of the venting membrane. Hence, the top cover, the baffle cover and the lower cover together form a labyrinth sealing.

According to an alternative embodiment, the cover comprises a plurality of ribs that are spaced apart, e.g. in a direction essentially parallel to the first surface of the venting membrane. Further, the ribs are designed such that in a normal direction each rib overlaps at least partially with the adjacent ribs. In other words, in a cross section of the ribs in a normal direction of the venting membrane a first rib covers at least part of an adjacent second rib in the normal direction of the venting membrane. Hence, no linear path from the first surface of the venting membrane can pass to the environment without being blocked in the cover.

In still another embodiment of the ventilation device according to the disclosure, the lateral side wall of the housing comprises a fluid outlet above the venting membrane, particularly above the first surface of the venting membrane. The fluid outlet is an opening in the lateral wall connecting the breathing chamber and the exterior environment. Water that passed through the cover and accumulated on the venting membrane is drained from the housing via the fluid outlet. Hence, damage to the venting membrane due to the mass of the accumulated water can be avoided. Further, a protective structure may be arranged between the fluid outlet and the venting membrane for blocking any direct path, e.g. water jet, from the exterior environment to the venting membrane through the fluid outlet. Therein an IP6k9k rating can be achieved for the ventilation device comprising a fluid outlet as described here.

According to another embodiment, the venting membrane is supported by a support structure, wherein the support structure is arranged within the breathing chamber. In other words, the support structure supports the second surface of the venting membrane. The support structure may be a mesh, grid, or ribs that are connected to or attached to an inner side of the lateral wall of the housing. Also, the support structure is formed as a single piece with the housing. Due to the support structure the venting membrane withstands higher pressures acting on the first surface than on the second surface. Hence, premature rupture of the venting membrane due to environmental influences is avoided.

Another aspect of the present disclosure relates to a battery, comprising a battery casing with a vent opening therein and a ventilation device as described above, wherein the housing of the ventilation device is attached to the vent opening of the battery casing. The battery is one of a battery submodule, a battery module and a battery system and hence the battery casing is one of a battery submodule casing, a battery module casing and a battery system casing. The housing is attached to the vent opening by being inserted into the vent opening or by covering or overlapping the vent opening while being actually attached to the battery casing. The interior of the casing is separated from the breathing chamber by the breathable filter.

In a normal operation of the battery, breathing occurs through the breathable filter, the breathing chamber and the breathing sprout of the ventilation device. The venting membrane and the breathable filter, particularly their thickness and material, are configured to withstand the pressure exerted thereon during normal operation of the battery. The venting membrane and the breathable filter, particularly their thickness and material, are further configured to rupture at a predetermined pressure exerted thereon, at least from within the interior of the battery casing, e.g. onto a second surface of the venting membrane, wherein the predetermined pressure is below a maximum allowed pressure within the battery casing. Hence, in a venting event the breathable filter and the venting membrane rupture and the vent gas stream can exit the battery casing through the ventilation device in short time.

The housing of the ventilation device further comprises at least one attachment means that is configured for being attached to the battery casing. In an embodiment of the battery as described above, the battery casing further comprises at least one internal thread. The internal thread is cut into the vent opening. According to this embodiment, the housing of the ventilation device comprises a sealing portion and a thread portion with an external thread as attachment means. The ventilation device is attached to the battery casing by engaging the external thread of the thread portion with the internal thread of the casing's vent opening. Therein, the sealing portion is pressed to an outer surface of the battery casing and hence the ventilation device is sealed with respect to the battery casing.

According to another embodiment, the battery further comprises a nut with an internal thread. The outer size of the nut is fitted to the vent opening of the battery casing. According to this embodiment, the housing of the ventilation device comprises a sealing portion and a thread portion with an external thread as attachment means. The size and dimension of the thread portion can be fitted to the inner size of the nut. The ventilation device is attached to the battery casing by engaging the external thread of the thread portion with the internal thread of the nut, while wedging the battery casing between the sealing portion of the ventilation device and the nut. Alternatively, the thread portion can comprise an internal thread and its outer size can be fitted to the vent opening and outer size of the nut is fitted to the inner size of the thread portion and the nut comprises an external thread.

According to another embodiment, the ventilation device, particularly the housing of the ventilation device comprises at least one attachment portion with an internal thread. The attachment portion and/or other parts of the housing also comprise a sealing portion. The attachment portion may further comprise a metallic insert that is overmolded with the housing of the ventilation device. Alternatively, the internal thread is formed as a single piece with the housing of the ventilation device. According to this embodiment, the battery further comprises at least one screw and the battery casing comprises at least one mounting hole additional to the vent opening. The ventilation device can then be attached to the battery casing by attaching at least one screw via the mounting hole to the internal thread of the ventilation device.

Another aspect of the present disclosure relates to a vehicle comprising a battery as described above. Further aspects of the present disclosure are disclosed within the dependent claims, the attached drawings or within the following description of the attached drawings.

Such a ventilation device according to an embodiment of the present disclosure and a battery including the same may be applied to a battery pack for an electric vehicle and an energy storage system (ESS).

DESCRIPTION OF THE DRAWINGS

Features will become apparent to those of ordinary skill in the art by describing in detail exemplary embodiments with reference to the attached drawings in which:

FIG. 1 illustrates a schematic perspective view of a ventilation device according to a first embodiment;

FIG. 2 illustrates a schematic perspective view of a cross section of a ventilation device according to the first embodiment;

FIG. 3 illustrates a schematic perspective front view of a cross section of a ventilation device according to the first embodiment during a venting event;

FIG. 4 illustrates a top view of a ventilation device according to the first embodiment;

FIG. 5 illustrates a schematic perspective front view of a cross section of a ventilation device according to the first embodiment during breathing operation;

FIG. 6 illustrates a schematic perspective view of a cross section of a ventilation device according to a second embodiment;

FIG. 7 illustrates a schematic side view of a cross section of a cover of a ventilation device according to the second embodiment;

FIG. 8 illustrates a top view of a top cover for a ventilation device according to an embodiment;

FIG. 9 illustrates a schematic perspective view of a top cover for a ventilation device according to an embodiment;

FIG. 10 illustrates a schematic perspective view of a cross section of a cover for a ventilation device according to an embodiment;

FIG. 11 illustrates a top view of a cover for a ventilation device according to an embodiment;

FIG. 12 illustrates a top view of a horizontal cross section of a ventilation device according to an embodiment;

FIG. 13 illustrates a bottom view of a horizontal cross section of a ventilation device according to an embodiment;

FIG. 14 illustrates a schematic perspective view of a battery with a ventilation device according to an embodiment; and FIG. 15 illustrates a schematic view of a cross section of the ventilation device in the battery as shown in FIG. 14.

MODE FOR INVENTION

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted. As used herein, the term "and/or" includes any and all combinations of one or more of the associated listed items.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention.

In the following description of embodiments of the present invention, the terms of a singular form may include plural forms unless the context clearly indicates otherwise. It will be further understood that the terms "include," "comprise," "including," or "comprising" specify a property, a region, a fixed number, a step, a process, an element, a component, and a combination thereof but do not exclude other properties, regions, fixed numbers, steps, processes, elements, components, and combinations thereof.

It will also be understood that when a film, a region, or an element is referred to as being "above" or "on" another film, region, or element, it can be directly on the other film, region, or element, or intervening films, regions, or elements may also be present. Further, the terms "upper" and "lower" are defined according to the z-axis. For example, the upper cover is positioned at the upper part of the z-axis, whereas the lower cover is positioned at the lower part thereof. In the drawings, the sizes of elements may be exaggerated for clarity.

As used herein, the term "substantially," "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an overly formal sense, unless expressly so defined herein.

FIG. 1 illustrates a schematic perspective view of a ventilation device 10 according to a first embodiment. The ventilation device 10 comprises a housing 20 with an essentially cylindrical shape and a mainly solid lateral wall 21. The housing could also have an essentially rectangular shape of any other suitable shape. A cover 60 is mounted to the lateral wall 21 of the housing 20 from above and a nut 80 is mounted to housing 20 from underneath. Ventilation device 10 is mounted between a battery casing interior 91 and an exterior environment 92.

FIG. 2 illustrates a schematic perspective view of a cross section of ventilation device 10 according to the first embodiment illustrated in FIG. 1. The housing 20 comprises an upper cylindrical section 21a of a first diameter and enclosed by an upper section of lateral wall 21. The housing 20 further comprises a lower cylindrical section 21b that is enclosed by an upper section of lateral wall 21 and that has a second diameter that is smaller than the first diameter (see also FIG. 3). The membrane 40 separates the upper cylindrical section 21a and the lower cylindrical section 21b. The lower cylindrical section 20b is formed as a thread portion 84 with an outer thread 82. A transition part between the lower cylindrical section 21a and the upper cylindrical section 21b is formed as a sealing portion 83.

At a lower end of the lower cylindrical section 21b, a breathable filter 30 is mounted to an inner side 23 of the lateral wall 21 of the housing 20. The breathable filter 30 is welded or glued thereto. Alternatively, the breathable filter 30 is mounted to a lower face of the lower cylindrical section 21b and/or hence housing 20. The breathable filter 30 is formed of a breathable mesh that is dust tight according to an IP6x protection level. The breathable filter 30 is formed of a porous material, particularly a porous plastic material, of a textile material, particularly a GoreTex® material, or of paper material. The connection between the breathable filter 30 and the housing 20, particularly the lateral wall 21, also suffices the IP6x protection level. At a lower end of the upper cylindrical section, i.e. directly above the sealing portion 83, a venting membrane 40 is mounted, for example ultrasonically welded, overmolded or glued, to the inner side 23 of the lateral wall 21 of housing 20. The venting membrane 40 consists of a solid thin material, for example of a plastic material or aluminum. The solid thin material of the venting membrane 40 as well as the weld connection between the membrane 40 and the inner side 23 of lateral wall 21 suffices an IP67 or IP68 protection level.

Between the breathable filter 30, the venting membrane 40 and the inner side 23 of the lateral wall 21 a breathing chamber 22 is at least partially enclosed. As illustrated in FIG. 2, the breathing chamber 22 essentially fills the entire volume of the lower cylindrical section 21b of housing 20. A breathing sprout 50 is an elongated hollow cylinder that is formed as a single piece with the housing 20 by injection molding of a thermosetting resin, such as APS, PP, PU, PBT or the like with or without reinforcement. Alternatively, the breathing sprout 50 is separate to the housing 20 and sealed with respect to the housing 20. The breathing sprout 50 comprises a breathing hole 52 its hollow tube that extends from a first opening in the lateral wall 21 of the breathing chamber 22 towards a second opening at the end of the sprout 50 and facing the exterior environment 92. Hence, the breathing sprout 50 fluidly connects the breathing chamber 22 with the exterior environment 92. An outer part of the breathing sprout 50 facing the exterior environment 92 is formed as a tube adapter 51 for attaching a breathing tube to the breathing sprout 50. The breathing tube may be configured to guide gases away from the ventilation device 10, e.g. to the outside of a vehicle. Even with such tube adapter 51 an IP67 or IP68 rating is achieved for the whole device 10.

During normal function of a battery comprising the ventilation device 10 according to the disclosure, the breathing sprout 50 ensures the breathing function of the ventilation device 10. Due to pressure differences between the battery casing interior 91 and the exterior environment 92 gas can stream from the battery casing interior 91 through the breathable filter 30 into the breathing chamber 22 and from there through the breathing sprout 50 to the exterior environment 92. Therein, particles and dust transported by the gas stream are filtered by the breathable filter 30. The venting membrane 40 is a solid foil and sealingly mounted, e.g. sealed, welded or overmolded, to the inner side of the lateral wall 21 of housing 20 and hence the breathing gas cannot stream elsewhere. Further, as the breathing chamber 22 is relatively large, it guarantees that small particles or dust do not regularly bung the opening of breathing hole 52 of breathing sprout 50 during normal function of the battery and breathing function of ventilation device 10.

A cover 60 that is clipped to the housing 20 from above comprises a top cover 63 that corresponds to a top surface of the cylindrical housing 20. The cover 60 comprises a baffle cover 64 that is injection molded as a single piece with top cover 63. The baffle cover 64 is parallel to the top cover 63 and connected thereto via a central piece. The baffle cover 64 is disposed between the top cover 63 and the venting membrane 40 and spaced apart from the top cover in a normal direction of membrane 40. The cover 60 further comprises clips 26 (see FIG. 3) with first sections extending downward from the top cover 63 and a second sections extending outward from the first sections. The clips 26 are injection molded as one piece with the top cover 63. The outwardly extending second sections of clips 26 are inserted into corresponding openings 25 in the lateral wall 21 of housing 20. A plurality of such clips 26, e.g. four clips, is arranged around the circumference of the lateral wall 21.

As illustrated in FIG. 4, the top cover 63 comprises three first open sections 61 that are separated from each other in a circumferential direction by three first closed sections 62. The baffle cover 64 comprises a second closed section 65 extending outward from the central piece and having a diameter that exceeds the diameter of the venting membrane 40 and that is smaller than the diameter of the upper cylindrical section 21a of the housing 20. Hence a ring-shaped gap is formed between an outer perimeter of the second closed section 65 of the baffle cover 64 and the inner side 23 of the lateral wall 21.

In a venting event as illustrated FIG. 3 huge amounts of gas need to stream out off the battery quickly to prevent the battery casing and/or surrounding parts from being damaged. The ventilation devices 10 enables the vent gas coming from the battery casing interior 91 as illustrated by the thin lined arrow in FIG. 3 to stream through the breathing filter 30 or to rupture the breathing filter 30. The vent gas then streams through the breathing chamber 22 and ruptures the venting membrane 40. Then the vent gas streams through the ring-shaped gap between the baffle cover 64 and outer wall 21 and through the first open sections 61 of top cover 63 to the exterior environment 92 as illustrated by the thick lined arrows. Due to the large cross sections of the housing's 20 lower and upper cylindrical section 21a, 21b, of the ring-shaped gap and the first open sections 61 a quick exhaust of the vent gas is achieved. The venting membrane 40, and the breathing filter 30, is configured to rupture at a pressure below a maximum allowed pressure within battery casing interior 91.

In order to protect the ventilation membrane 40 from damage due to incident obstacles or water jets the cover 60 is further designed as illustrated in the schematic perspective view of FIG. 5. Therein water jets incident on the cover 60 from the exterior environment 92 is illustrated by arrows. Although the first open sections 61 comprise a large cross section for allowing a quick vent gas exhaust they are arranged relatively to the second closed section 65 of the baffle cover 64 in a way that prevents water jets coming from any direction from the exterior environment 92 to hit the venting membrane 40 directly. In detail the second closed section 65 overlaps the first open sections 61 in a normal direction of the venting membrane 40. Thus cover 60 realizes a protection level up to an IP6k9k protection level and realizes a protection level of at least IP6k9k of the ventilation device 10.

The ventilation device 10 of the first embodiment as illustrated in FIGS. 1 to 5 can be attached to a battery casing using a nut 80 as illustrated in FIGS. 1 and 2. The nut 80 comprises an internal thread 81 and is positioned below a venting opening of a battery casing and within the battery casing. The nut may be preinstalled in a battery casing. The housing 20 of ventilation device 10 comprises the lower cylindrical section 21b as a thread portion 84 that comprises an external thread 82. The thread portion 84 is passed through the vent opening of battery casing and the external thread 82 is engaged with the internal thread 81 of the nut 80 below the vent opening. Thus, the battery casing (not illustrated) is wedged between a top surface of the nut 80 and a lower surface of the sealing portion 83 such that a separate sealing (e.g. O-ring) 27 is pressed against the battery casing and seals the ventilation device 10 against the battery casing. Hence, according to the first embodiment the thread portion 83 and the sealing portion 84 of housing 20 form attachment means 24 of the ventilation device 10.

FIGS. 6 and 7 illustrate an alternative design of the ventilation device 10 according to a second embodiment, wherein FIG. 6 illustrates a schematic perspective view of a cross section of the ventilation device 10 according to the second embodiment and FIG. 7 illustrates a schematic side view of a cross section of the cover 60 of the ventilation device 10 according to the second embodiment.

The ventilation device 10 of the second embodiment is similar to that of the first embodiment with respect to the principally cylindrical housing 20, the breathable filter 30, the venting membrane 40 and the breathing sprout 50. Hence a description thereof is omitted here.

As illustrated in FIG. 6, the cover 60 of the second embodiment is injection molded as a single piece with the lateral wall 21 of the housing 20. However, the cover 60 could also be bonded or clipped to the lateral wall 21 of the housing 20. The cover 60 comprises a plurality of ribs 70 that extend in a direction that is essentially parallel to the venting membrane 40, i.e. in a direction that is substantially perpendicular to a normal direction of the venting membrane 40. The cover design of the ventilation device 10 according to the second embodiment allows for a reduced height in a normal direction of the venting membrane 40 compared to the ventilation device 10 of to the first embodiment, although there is no loss of free streaming cross sections, i.e. flow area, for the vent gas in a venting event.

As illustrated in FIG. 7, the ribs 70 comprise an essentially V-shaped cross section in a normal direction of the venting membrane 40. Therein, the V-shape is such that a first rib 71 and an adjacent second rib 72 comprise an overlap 73, respectively. In other words, at least a part of each first rip 71 overlaps with at least a part of each adjacent second rib 72 in a normal direction of the venting membrane. This design allows a gas stream (illustrated by thick lined arrows in FIG. 7) to freely passage through the channels between adjacent ribs, wherein water jets (illustrated by thin lined arrows in FIG. 7) coming from the exterior environment 92 are redirected (illustrated by dashed lined arrows in FIG. 7) by the ribs 70.

As illustrated in FIG. 6, the ventilation device 10 of to the second embodiment further differs from that of the first embodiment in that it comprises a plurality of attachment means 24 that are injection molded monolithically with the housing 20 and that are molded to an outer perimeter of the housing 20. Each of the attachment means 24 is formed as a blind hole with its opening facing downward in the direction of the battery casing. A metal insert 85 is pressed or overmolded into each of the blind holes. The metal inserts 85 comprise internal threads and hence the ventilation device 10 can be screwed to a battery casing using screws.

Further the ventilation device 10 of the second embodiment comprises an integrated sealing structure 28 that is formed as a single piece with the housing 20 in a two component injection molding process (2K molding). Alternatively, the separate sealing 27 as in the embodiment of FIGS. 1 to 5 could be employed. The integrated sealing structure 28 runs around the outermost perimeter of the housing 20, e.g. around the perimeter of attachment means 24. The integrated sealing structure 28 is made of a softer resin than the remaining housing 10 and comprises an essentially V-shaped cross section with the V's opening facing downward to the battery casing. By screwing the ventilation device 10 to a battery casing the sealing structure 28 is pressed to the battery casing and sealed against the battery casing. The integrated sealing structure 28 cannot be lost as the separate sealing 27.

FIGS. 8 to 11 show an alternative embodiment of a cover 60 for a ventilation device 10 according to an embodiment, e.g. for the ventilation device 10 of the first embodiment.

FIGS. 8 and 9 show a top cover 63 according to this alternative cover design in a top view and in a perspective view respectively. The top cover 63 is an injection molded part with a plurality of cut outs as first open sections 61 and a plurality of circular screens as first closed sections 62. In order to protect the venting membrane 40 from damage due to environmental influences coming from the exterior environment 92 a stack of at least two of such covers is required, wherein in the second cover the circular screens become cut outs and vice versa.

Alternatively, a plurality of covers as illustrated in FIGS. 8 and 9 are fixed, e.g. clipped, together to form a stack of, e.g. three, covers as illustrated in FIGS. 10 and 11. In such a stack an uppermost cover forms a top cover 63 and intermediate cover forms a baffle cover 64 and a lowermost cover form a lower cover 67.

The top cover 63 comprises cutouts as first open sections 61 and circular screens as first closed sections 62. The baffle cover 64 comprises cutouts as second open sections 66 and circular screens as second closed sections 65. The lower cover 67 comprises cutouts as third open sections 68 and circular screens as third closed sections 69. By stacking the three covers 63, 64 and 67 in a way that each cover is rotated by approximately 60° with respect to an adjacent cover, it is achieved that the cut outs 61, 66, 68 of adjacent covers do not overlap in a normal direction of a venting membrane 40. On the contrary, the closed sections 62, 67, 69 of each of the covers 63, 64, 67 overlap with the open section 61, 66, 68 of the adjacent covers 63, 64, 67 and hence water jets sputters due to the labyrinth sealing design achieved by the combination of covers 63, 64, 67. This is illustrated in FIG. 11, wherein the second closed sections 65 of the baffle cover 64 are illustrated as black dashed areas that are visible through the first open sections 61 of the top cover 63. Hence, IP6k9k protection is achieved.

FIGS. 12 and 13 illustrate additional features that can be applied to any embodiment of the ventilation device 10. Particularly, FIG. 12 illustrates a top view of a horizontal cross section of a ventilation device 10 according to an embodiment and FIG. 13 illustrates a bottom view of a horizontal cross section of a ventilation device 10 according to an embodiment.

As illustrated in FIG. 12 the lateral wall 21 of the housing 20 can comprise a fluid outlet 29a as a through hole in the lateral wall 21. In the case that the ventilation device 10 is mounted in an unfavorable position, water can drip through the open sections 61 or ribs 70 of cover 60 and can accumulate on top of the venting membrane 40. The accumulated water can either damage the venting membrane 40 or at least result in higher burst pressures at which the venting membrane 40 ruptures, wherein the latter usually is not tolerable. The fluid outlet 29a is positioned above the venting membrane 40 and hence accumulated water can be drained from the housing 20 via the fluid outlet 29a. In order to achieve protection class up to an IP6k9k protective rating, an IP6k9k protective rating, of the ventilation device 10 despite the fluid outlet 29a, a protective rib 29b can be positioned between the fluid outlet 29a and the venting membrane 40. The protective rib 29b is configured such that any linear path between the fluid outlet and the venting membrane 40 is blocked by the protective rib 29b and hence water jets through fluid outlet 29a cannot damage the venting membrane 40.

As illustrated in FIG. 13 the venting membrane 40 is supported by a membrane support 41 positioned below the venting membrane 40 within the breathing chamber 22. The membrane support 41 is formed integrally with the lateral wall 21 of the housing, by injection molding them as single piece. Alternatively, the support structure can be clipped or bonded, e.g. glued to the lateral wall 21 of the housing 20. The membrane support 41 is formed as a solid mesh or grid structure that does not significantly lower the flow area for the vent gas stream. At the same time the venting membrane 40 lays upon the mesh or grid. Hence due to the membrane support 41 the venting membrane 40 withstands higher pressure from the exterior environment 92 than from the breathing chamber 22 and battery casing interior 91. Hence, a premature rupture of the venting membrane 40 can be avoided.

FIG. 14 illustrates a schematic perspective view of a battery 90 with a ventilation device 10 according to an embodiment and FIG. 15 illustrates a schematic view of a cross section of the ventilation device 10 in the casing 93 of battery 90 as shown in the FIG. 14.

The battery 90 comprises a battery casing 93 that may consist of a metal alloy and/or a plastic material. The battery casing consists of an upper casing part 93a and a lower casing part 93b that are connected to each other via a plurality of screw connections across a flange 95. The battery 90 further comprises a plurality of attachment portions 96 for mounting the battery 90 to a fixing structure (not shown), for example of an electric vehicle or the like.

A ventilation device 10 according to an embodiment is inserted into a top wall of the upper casing part 93a and therein fills a vent opening (not shown) of the upper casing part 93a.

As shown in FIG. 15 the vent opening is a cut out of the upper casing part 93a the size of which is fitted to a width of the ventilation device 10 which is configured as described above with reference to FIGS. 6 and 12. Particularly, the ventilation device 10 comprises a plurality of attachment means 24 that are injection molded monolithically with the housing 20 and that are molded to an outer perimeter of the housing 20. Each of the attachment means 24 is formed as a blind hole with its opening facing downward in the direction of the upper battery casing 93a. A metal insert 85 is pressed or overmolded into each of the blind holes. The metal inserts 85 comprise internal threads and the ventilation device 10 is screwed to the upper casing part 93a via a plurality of screws 94 from an interior 91 of the casing 93.

Although the embodiments of the present disclosure have been described above, the present invention is not limited thereto, and various modifications and changes can be made within the scope of the claims, the detailed description of the invention and the accompanying drawings, which also naturally belong to the scope of the present invention.

DESCRIPTION OF SYMBOLS 10 ventilation device
20 housing
21 lateral wall
21a upper cylindrical section 21b lower cylindrical section
22 breathing chamber
23 inner side of the lateral wall
24 attachment means
25 opening
26 cover clip
27 sealing O-ring
28 integrated sealing structure
29a fluid outlet
29b protective structure
30 breathable filter
40 venting membrane
41 membrane support
50 breathing sprout
51 tube adapter
52 breathing hole
60 cover
61 first open section
62 first closed section
63 top cover
64 baffle cover
65 second closed section
66 second open section
67 lower cover
68 third open section
69 third closed section
70 cover rib
71 first rib
72 second rib
73 overlap
80 nut
81 internal thread
82 external thread
83 sealing portion
84 thread portion
85 metal insert
90 battery
91 battery casing interior
92 exterior environment
93 battery casing
94 screw
95 flange

The invention claimed is:

1. Ventilation device for a battery, comprising:
a housing configured for being attached to a battery casing in a sealing manner and comprising at least one lateral wall;
a breathable filter extending across and closing a distal end of the at least one lateral wall and configured for separating an interior of the battery casing from a breathing chamber within the housing;
a venting membrane configured for separating the breathing chamber from an exterior environment in a gas tight manner and configured to rupture in response to gas pressure inside the housing reaching a reference pressure or greater; and
a breathing sprout opening directly into the breathing chamber to fluidly connect the breathing chamber and the exterior environment and bypassing the venting membrane,
wherein the breathing chamber is defined by the at least one lateral wall, the breathable filter, and the venting membrane, and
wherein in a venting event, the ruptured venting membrane provides a flow area for a vent gas stream that is at least two times larger than a flow area of the breathing sprout.

2. Ventilation device according to claim 1, wherein the breathing chamber is enclosed by the breathable filter, the venting membrane, and the at least one lateral wall of the housing.

3. Ventilation device according to claim 1, wherein the breathable filter and/or the venting membrane is welded, bonded or overmolded to the at least one lateral wall of the housing.

4. Ventilation device according to claim 1, wherein at least the venting membrane is configured for rupturing in a venting event of the battery.

5. Ventilation device according to claim 1, further comprising a cover connected to the lateral wall of the housing and configured for protecting the venting membrane from environmental influences.

6. Ventilation device according to claim 5, wherein the cover comprises at least one opening with a flow area that is larger than that of the breathing sprout.

7. Ventilation device according to claim 5, wherein the cover comprises:
a top cover with at least one first open section and at least one first closed section;
a baffle cover positioned between the top cover and the venting membrane and comprising at least one second closed section,
wherein the at least one second closed section overlaps the at least one first open section in the normal direction of the venting membrane.

8. Ventilation device according to claim 7, wherein the cover further comprises:
a lower cover positioned between the baffle cover and the venting membrane and comprising at least one third open section and at least one third closed section,
wherein the at least one third closed section overlaps at least one second open section in the normal direction of the venting membrane, and
wherein the top cover, the baffle cover and the lower cover together form a labyrinth sealing.

9. Ventilation device according to claim 5, wherein the cover comprises a plurality of spaced apart ribs comprising a first rib overlapping with an adjacent second rib in the normal direction of the venting membrane.

10. Ventilation device according to claim 1, wherein the at least one lateral wall comprises a fluid outlet above the venting membrane and a protective structure arranged between the fluid outlet and the venting membrane.

11. Ventilation device according to claim 1, wherein the venting membrane is supported by a support structure within the breathing chamber.

12. Ventilation device according to claim 1, wherein the battery is one of a battery submodule, a battery module and a battery system.

13. Ventilation device according to claim 1, wherein the housing comprises at least one attachment means configured for attaching the housing to the battery casing.

14. Battery, comprising:
a battery casing with a vent opening; and
a ventilation device according to claim 1,
wherein the housing of the ventilation device is attached to the battery casing and wherein an interior of the battery casing is separated from the breathing chamber by the breathable filter.

15. Battery according to claim 14, further comprising an internal thread in the battery casing, a nut with an internal thread or at least one screw,
wherein the ventilation device comprises a sealing portion and a thread portion with an external thread as attachment means and is attached to the battery casing by engaging the external thread with the internal thread of the battery casing, or wherein the ventilation device comprises a sealing portion and a thread portion with an external thread as attachment means and is attached to the battery casing by engaging the external thread with the internal thread of the nut and by wedging the battery casing between the ventilation device and the nut, or wherein the ventilation device comprises at least one metal insert with an internal thread as attachment means and is screwed to the battery casing by the at least one screw.

\* \* \* \* \*

UNITED STATES PATENT AND TRADEMARK OFFICE
CERTIFICATE OF CORRECTION

| | | |
|---|---|---|
| PATENT NO. | : 11,962,031 B2 | Page 1 of 1 |
| APPLICATION NO. | : 16/646095 | |
| DATED | : April 16, 2024 | |
| INVENTOR(S) | : Waha et al. | |

It is certified that error appears in the above-identified patent and that said Letters Patent is hereby corrected as shown below:

On the Title Page

Item (73) Assignee, Please change "XSamsung SDI Co., Ltd." to -- Samsung SDI Co., Ltd. --.

Signed and Sealed this
Fourth Day of November, 2025

John A. Squires
*Director of the United States Patent and Trademark Office*